United States Patent Office 3,748,310
Patented July 24, 1973

3,748,310
ENDO ALICYCLIC END CAPPED
POLYIMIDAZOPYRROLONE
Eugene A. Burns, Palos Verdes Peninsula, and Robert J.
Jones, Hermosa Beach, Calif., assignors to TRW Inc.,
Redondo Beach, Calif.
No Drawing. Filed Apr. 3, 1972, Ser. No. 240,832
Int. Cl. C08g 20/00, 20/32
U.S. Cl. 260—78.4 R                            14 Claims

ABSTRACT OF THE DISCLOSURE

Resins having high temperature stability can be made by curing chemically stable alicyclic endo end capped aromatic prepolymers. The prepolymers can be made by reacting proper stoichiometric amounts of tetraacids or derivatives with an aromatic tetraamine, and an end capping compound having the formula

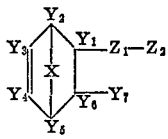

wherein $Y_1$–$Y_6$, inclusive, can be hydrogen, halogen, nitro, aryl, alkyl, alkyl ether, or alkaryl; X can be carbonyl, oxygen, sulfur, methylene, halogen substituted methylene, alkyl substituted methylene, or aryl substituted methylene; $Z_1$ can be an arylene or an alkylene group having 0 to 1 carbon atoms; $Z_2$ can be an isocyanate radical or an amine radical; and $Y_7$ can be an isocyanate radical or amino in a stable combination with $Y_6$. The end capping compound can be synthesized by reacting a cyclo diolefin with an olefinic compound according to a Diels-Alder reaction.

BACKGROUND OF THE INVENTION

The present invention relates to stable, high temperature aromatic resins. Resins, according to this invention, are produced by a pyrolytic polymerization of prepolymers having reactive terminal groups. Pyrolytic polymerization is the coreaction of the reactive groups located at the terminal ends of the prepolymer upon heating at elevated temperature to cause chain extension and crosslinking of the prepolymer segment.

Polyimide resins having been produced by the pyrolytic polymerization reaction of a polyimide prepolymer having end caps of bicyclo (2.2.1)hept-5-ene-2,3-anhydride as disclosed in U.S. Pat. 3,528,590. The polyimide prepolymer was produced by reacting a diamine with a dianhydride and end capping the chain with a monoanhydride having the structure:

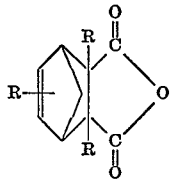

where R is hydrogen or an alkyl group.

Synthesis of compounds similar to the alicyclic endo compounds used herein have been disclosed by Diels and Alder in U.S. Pat. 1,944,731. These compounds are produced by reacting a diene with a dienophile to produce a six-membered ring compound.

SUMMARY OF THE INVENTION

The high temperature aromatic resins of this invention are produced by reacting an aromatic tetraamine with a tetracarboxylic acid or derivative and end capping the polymer chain with a substitute alicyclic endo compound. The polymer chain which is produced by reacting stoichiometric amounts of a tetraacid or derivative and the tetraamine is end capped with a substituted alicyclic endo compound having the formula:

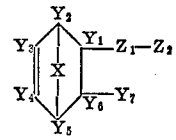

wherein $Y_1$–$Y_6$, inclusive, may be selected from hydrogen, halogen, nitro, aryl, alkyl having 1 to 6 carbon atoms, alkyl ether having 1 to 6 carbon atoms, or alkaryl; X may be selected from any of carbonyl, oxygen, sulfur, methylene, halogen substituted methylene, alkyl substituted methylene, or aryl substituted methylene; $Z_1$ is an arylene or an alkylene radical having 0 to 1 carbon atoms; $Z_2$ may be selected from any of: $-NH_2$ or $-N=C=O$ and $Y_7$ can be selected from an isocyanate radical or amino radical.

The end capping endo compound is produced by a Diels-Alder reaction wherein a cyclo diolefin having a formula:

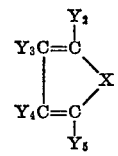

wherein $Y_2$–$Y_5$, inclusive, may be selected from any of hydrogen, halogen, nitro, aryl, alkyl having 1 to 6 carbon atoms, alkyl ether having 1 to 6 carbon atoms, alkaryl; and X may be selected from any of carbonyl, oxygen, sulfur, methylene, halogen substituted methylene, alkyl substituted methylene or aryl substituted methylene is reacted with an olefinic compound having the formula:

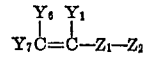

wherein $Y_1$ and $Y_6$ may be selected from any of hydrogen, halogen, nitro, aryl, alkyl having 1 to 6 carbon atoms, alkyl ether having 1 to 6 carbon atoms, or alkaryl; $Y_7$ may be selected from an isocyanate radical or amino radical; $Z_1$ is an arylene or an alkylene radical having 0 to 1 carbon atoms; and $Z_2$ may be selected from any of $-NH_2$ or $-N=C=O$.

The prepolymers of this invention are made by reacting a tetraacid or derivative with a tetraamine and end capping the prepolymer with an alicyclic endo diamine or diisocyanate compound which may be illustrated ideally as follows:

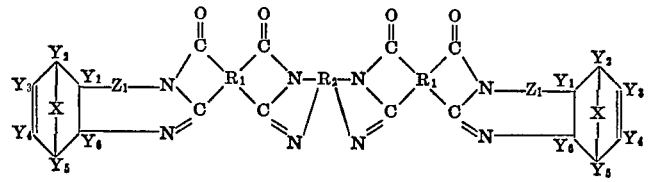

where $R_1$ is a tetravalent aliphatic or aromatic radical, $R_2$ is a tetravalent aromatic radical, and the $n$ is an integer from 1 to 20.

Product properties of the cured polymer can be enhanced by the inclusion of olefinic crosslinking agents in amounts up to about 10% by weight of the resin at initiation of cure.

DISCLOSURE OF THE INVENTION

High temperature resins of this invention are made by curing prepolymers prepared by reacting stoichiometric amounts of an aliphatic or aromatic tetraacid or derivative with an aromatic tetraamine and end capping the prepolymer with an alicyclic endo diamine or diisocyanate compound. The prepolymers are characterized in that they are self-stable solids which react through the alicyclic endo compound to form a polymer having good properties in the temperature range of 300° C.–400° C. One of the chief advantages of these resins, in addition to their excellent physical and thermal properties, is the relative ease with which laminated or molded articles may be fabricated from them. Thus, rather than fabricating articles from a liquid resin, fabricators may form the solid prepolymers of this invention from the liquid starting materials and fabricate the articles from a dry or slightly tacky prepolymer. The savings in cleanup time and materials is substantial without sacrifice of product properties.

Alicyclic endo end cap compounds are synthesized by reacting a cyclodiolefin having the formula:

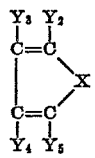

wherein $Y_2$–$Y_5$, inclusive, may be selected from any of hydrogen, halogen, nitro, alkyl having 1 to 6 carbon atoms, alkyl ether having 1 to 6 carbon atoms, or alkaryl; and X may be selected from any of carbonyl, oxygen, sulfur, methylene, halogen substituted methylene, alkyl substituted methylene, or aryl substituted methylene, with an olefinic compound having the formula:

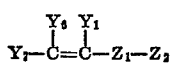

wherein $Y_6$ and $Y_1$ are selected from the same groups represented by $Y_2$–$Y_5$; $Y_7$ is selected from an isocyanate radical or an amino radical; $Z_1$ is an arylene or an alkylene radical having 0 to 1 carbon atoms; and $Z_2$ may be selected from any of: —$NH_2$ or —$N=C=O$. Ideally, the reaction may be represented as follows:

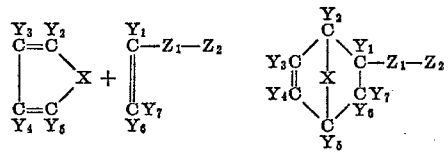

wherein $Y_1$–$Y_6$, X, $Z_1$, and $Z_2$ have been identified above. The reaction is carried out in a liquid solvent, such as benzene, and temperatures of the reaction may range from room temperature to about 200° F.

Special note should be made of the alicyclic endo diisocyanate or diamine compound because they can be synthesized for instance, by Curtius reaction, rather than by Diels-Alder reaction. According to the Curtius reaction, an alicyclic endo diacid or derivative is reacted with ammonia or hydrazine according to the following reaction:

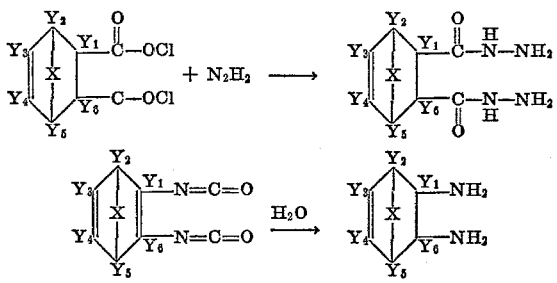

The following table provides a list of a few of the representative cyclodiolefin compounds which are suitable for reaction to produce the alicyclic endo end cap compounds.

TABLE I furane
cyclopentadieneone
3,4-diphenylthiophene
cyclopentadiene
methylcyclopentadiene
1,1,2,3,4,5-hexachlorocyclopentadiene The following table provides a list of a few of the representative olefinic compounds which are suitable for reaction to produce the alicyclic endo end cap compound.

TABLE II 1,3-allyl diisocyanate
ethylene diisocyanate

One of the resins according to this invention may be produced by reacting proper stoichiometric amounts of an aliphatic or aromatic tetraacid or dianhydride with an alicyclic endo diamine or diisocyanate at temperatures ranging from about 10° C. to about 200° C., and subsequently, or simultaneously, the mixture is reacted with an aromatic tetraamine in the presence of a dehydrating agent at temperatures ranging from about —18° C. to about 200° C. The reaction may be illustrated ideally as follows:

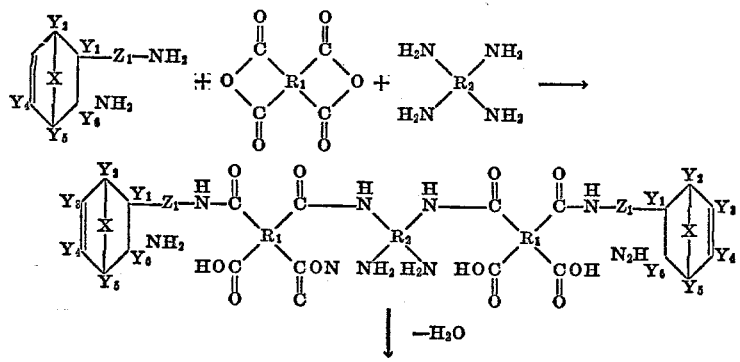

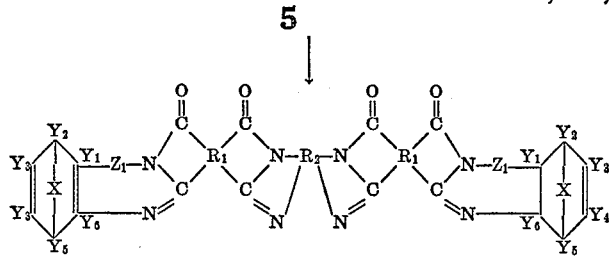

wherein $Y_1-Y_6$, inclusive, may be selected from hydrogen, halogen, nitro, alkyl having 1 to 6 carbon atoms, aryl, alkyl ether having 1 to 6 carbon atoms, or alkaryl; X may be carbonyl, oxygen, sulfur, methylene, halogen substituted methylene, alkyl substituted methylene, or aryl substituted methylene; $Z_1$ may be an arylene or an alkylene radical having 0 to 1 carbon atoms; $R_1$ is a tetravalent aliphatic or aromatic radical; $R_2$ is a tetravalent aromatic radical; and $n$ is an integer from 1 to 20.

Closure of the imidazopyrrolene ring is effected by a dehydrating in situ, i.e. simultaneously with the reaction of the constituents. The ring closure and prepolymer formation reactions must be carried out at temperatures below the polymer reaction temperature, i.e. below about 230° C.

Dehydrating agents used to facilitate the ring closure in the prepolymer reaction may be selected from organic anhydrides, such as acetic anhydride, and also, inert moisture adsorbing agents such as molecular sieves. Organic dehydrating agents are preferred because of their ease of removal from the resin product of the dehydration reaction. Of course, dehydrating agents are not required when using diisocyanates, however, more severe reaction conditions are required.

While the prepolymers may be synthesized from any aliphatic or aromatic dianhydride and any aromatic tetraamine, the compounds must be capable of reacting together and must remain stable at about 700° C. once they have reacted.

Examples of several typical aromatic tetraamines which may be used in this invention are:

TABLE III 3,3'-diaminobenzidine
1,2,3,5-tetraaminobenzene
3,3',4,4'-tetraaminodiphenyl ether
3,3',4,4'-tetraaminodiphenyl methane
3,3',4,4'-tetraaminodiphenyl sulfone
3,3',4,4'-tetraamino benzophenone
2,3,6,7-tetraamino naphthalene
2,3,5,6-tetraamino indene
3,3',4,4'-tetraaminodiphenyl ethane
3,3',4,4'-tetraaminodiphenyl propane Examples of several specific dianhydrides are listed in the following table:

TABLE IV pyromellitic dianhydride
benzophenone tetracarboxylic dianhydride
2,3,6,7-naphthalene tetracarboxylic dianhydride
3,3',4,4'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl) propane dianhydride
bis(3,4-dicarboxyphenyl) sulfone dianhydride
3,4,9,10-perylene tetracarboxylic dianhydride
bis(3,4-dicarboxyphenyl) ether dianhydride
ethylene tetracarboxylic dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
4,8-dimethyl-1,2,3,5,6,7-hexahydronaphthalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,3-bis(2,3-dicarboxyphenyl) propane dianhydride
1,1-bis(2,3-dicarboxyphenyl) ethane dianhydride
1,1-bis(3,4-dicarboxyphenyl) ethane dianhydride
bis(2,3-dicarboxyphenyl) methane dianhydride
bis(3,4-dicarboxyphenyl) methane dianhydride
bis(3,4-dicarboxyphenyl) sulfone dianhydride
bis(3,4-dicarboxyphenoxyphenyl) sulfone dianhydride
benzene-1,2,3,4-tetracarboxylic dianhydride
1,2,3,4-butane tetracarboxylic dianhydride
thiophene-2,3,4,5-tetracarboxylic dianhydride It should be understood that the tetracarboxylic acids, the esters and half esters of the dianhydrides listed in Table IV will be equally as suitable for use in the present invention. The ester and half ester substituents may be selected from aromatic, e.g. phenyl, or aliphatic, e.g. 1 to 4 carbon atoms, groups. As used in this context, the expression ester means that all four tetracarboxylic acid groups have aromatic or aliphatic substituent groups, while half ester means that only two of the tetracarboxylic acid groups have aromatic or aliphatic substituent groups.

Reaction of the prepolymer to form the polymeric product occurs through the alicyclic endo end capping compounds. While the exact mechanism of the polymeric reaction is not known, it is postulated that a three-dimensional polymer is formed when the prepolymer is subjected to temperatures from approximately 230° C. to 370° C. for up to 4 hours. Although it is not necessary for cure, it has been discovered that the application of up to 700 atmospheres is beneficial in removing voids with the resultant improvements in product properties. The cure times, temperatures, and pressures are variables which depend on the composition, mass, and shape of the article being produced. For example, the cure for a large mass of neat resin may require a lower temperature applied for a longer period of time at higher pressure in order to avoid cracking, incomplete consolidation, or voids, than a thin impregnated glass laminated article or a small article containing up to 80% by weight of inert fillers, such as inorganic salts, metals, or other common filler materials.

While it is preferred that the terminal groups used on the prepolymers of this invention constitute only the alicyclic endo compounds, it has been found that up to about one half of the alicyclic endo compound can be replaced by an olefinic compound, such as ethylene diisocyanate without materially altering the properties of many of the polymers. Ideally, this provides a prepolymer with a diaminoethylene radical end cap at one end of the prepolymer chain and an alicyclic endo end cap at the other.

In order to enhance product properties, crosslinking agents may be incorporated into the polymer chain. Solid or liquid organic compounds having olefinic unsaturation can be added to the initial starting materials while gaseous organic olefins are introduced into the starting material by reaction under pressure up to about 3000 p.s.i. Normally, an amount of crosslinking agent equivalent up to 10% by weight of resin at initiation of cure is used. Specific examples of a few of the gaseous olefinic compounds which are suitable crosslinking agents are ethylene, propylene, halogenated ethylene, halogenated propylene, and halogenated butadiene. Specific examples of liquid olefinic compounds which are suitable crosslinking agents are styrene, cyclopentadiene, furane, crotonic acid, acrylic acid and halogenated, phenyl substituted, or methyl substituted forms thereof. Specific examples of a few of the solid olefinic compounds which are suitable crosslinking agents for purposes of this invention are tetraphenylcyclopentadiene, maleic acid and derivatives, cinnamic acid, and stilbene. In addition to the gaseous, liquid, or solid crosslinking agents, crosslinkings sites may be built into the polymer chain by the use of polymer reactants having olefinic substituents; for example a polyimidazopyrrolone made from stilbene tetraamine or styrene dianhydride. Furthermore, it should be readily apparent to those skilled in the art that various combinations of the above crosslinking agents may be used.

The following examples are illustrative of the procedures used to practice this invention.

PREPARATION OF THE END CAP

Example I

Approximately 2.5 grams of 3,6-endomethylene-1,2,3,6-tetrahydrophthalic chloride and 0.5 gram of hydrazine hydrate are mixed in 50 cc. of absolute ethanol and refluxed for 6 hours. The mixture is cooled then, and crystals precipitate from solution. The crystals are washed in water and ethyl ether. The crystals are placed in a rapidly stirring chilled solution of 50 cc. of ice water, 10 cc. of 6 N hydrochloric acid, 50 cc. of ethyl ether and 4 grams of sodium nitrate in 15 cc. of water. Cracked ice is added if necessary to keep the temperature below 0° C. After about 20 minutes, the stirring is stopped and the ether is extracted from the aqueous phase. The aqueous phase is washed with two 50 cc. portions of ether and the combined ether extracts are distilled nearly to dryness. The solid residue is dissolved in 50 cc. of warm water, the solution filtered, and the filtrate is distilled to dryness. Recrystallization of 3,6-endomethylene-1,2-dihydro-1,2-phenylenediamine is carried out in hot absolute ethanol.

PREPARATION OF THE PREPOLYMER AND POLYMER

Example II

Approximately 2.5 grams of 3,6-endomethylene-1,2-dihydro-1,2-phenylenediamine, approximately 4.5 grams of pyromellitic dianhydride, and 2.2 grams of 3,3'-diaminobenzidine are slurried in 200 ml. of dimethylformamide. Approximately 20 grams of acetic anhydride is added to the solution. The resulting mixture is stirred for 3 hours to give a solution of amide-acid prepolymer. The dimethylformamide varnish is stripped of solvent and acetic acid/acetic anhydride by evaporation on a rotary evaporator under vacuum at 150° C. to give a dry powder. A ceramic dish containing the powder is placed in an oven at 350° C. for 30 minutes and then cooled to room temperature. A brown, rigid, thermoset polymer is formed.

We claim:

1. A method of making a prepolymer comprising reacting in the presence of an organic solvent proper stoichiometric amounts of:
   (A) an aromatic tetraamine;
   (B) an organic compound containing functional tetracarboxylic groups capable of reacting with said tetraamine;
   (C) an end cap compound comprising a substituted alicylic endo compound having the formula:

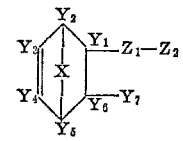

to give a prepolymer having 1 to 20 repeating units, wherein $Y_1$–$Y_6$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, oxygen, sulfur, methylene, halogen substituted methylene, alkyl substituted methylene, and aryl substituted methylene; $Z_1$ is selected from the group consisting of an arylene radical and an alkylene radical having 0 to 1 carbon atoms; $Z_2$ is selected from the group consisting of $-NH_2$ and $-N=C=O$; and $Y_7$ is selected from the group consisting of an isocyanate radical and amino radical, in a temperature range of 10° C. to about 200° C.; and (D) dehydrating at temperatures ranging from $-18°$ C. to about 200° C.

2. A method of making a prepolymer according to claim 1 wherein the tetracarboxylic compound is a dianhydride.

3. A method of making a prepolymer according to claim 1 wherein the tetracarboxylic compound is a phenyl ester.

4. A method of making a prepolymer according to claim 1 wherein the tetracarboxylic compound is a phenyl half ester.

5. A method of making a prepolymer according to claim 1 wherein the tetracarboxylic compound is an aliphatic ester having 1 to 4 carbon atoms.

6. A method of making a prepolymer according to claim 1 wherein the tetracarboxylic compound is an aliphatic half ester having 1 to 4 carbon atoms.

7. A method of making a prepolymer according to claim 1 wherein the olefinic crosslinking agent is added.

8. A method of making a prepolymer according to claim 1 wherein up to one half of the end cap compound is replaced by ethylene diisocyanate.

9. A thermosetting polyimidazopyrrolone having the formula:

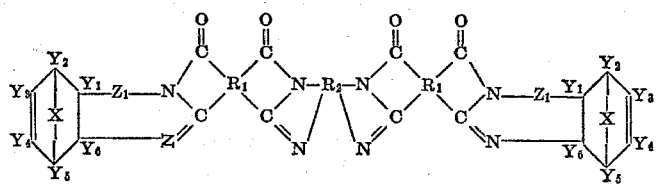

wherein $R_1$ is a tetravalent radical selected from the group consisting of aliphatic and aromatic; $R_2$ is a tetravalent aromatic radical; $Y_1-Y_6$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, oxygen, sulfur, methylene, halogen substituted methylene, alkyl substituted methylene, and aryl substituted methylene; $Z_1$ is selected from the group consisting of arylene and an alkylene radical having 0 to 1 carbon atoms; $Y_7$ is selected from the group consisting of an isocyanate radical and an amino radical, and $n$ is an integer of from 1 to 20.

10. A prepolymer according to claim 9 wherein up to one-half of the end cap compound is replaced by ethylene diisocyanate.

11. A prepolymer according to claim 9 wherein an olefinic crosslinking agent is added.

12. A resin product comprising curing the prepolymer of claim 9.

13. A resin product comprising curing the prepolymer of claim 10.

14. A resin product comprising curing the prepolymer of claim 11.

References Cited
UNITED STATES PATENTS

| | | | |
|---|---|---|---|
| 3,528,950 | 9/1970 | Lubowitz | 260—78.4 |
| 3,549,594 | 12/1970 | Twilley | 260—47 |
| 1,944,731 | 10/1933 | Diels et al. | 260—346.6 |
| 3,523,151 | 4/1970 | Steinberg | 264—210 |

JOSEPH L. SCHOFER, Primary Examiner

J. KIGHT, Assistant Examiner

U.S. Cl. X.R.

260—32.6 N, 47 CB CZ CP, 77.5 R, 78 R TF UA SC, 78.4 D, 282